US012802535B2

(12) United States Patent
Polk

(10) Patent No.: US 12,802,535 B2
(45) Date of Patent: Nov. 17, 2026

(54) ILLUMINATED SAFETY BELT DEVICE

(71) Applicant: Derrick Polk, Indianapolis, IN (US)

(72) Inventor: Derrick Polk, Indianapolis, IN (US)

( * ) Notice: Subject to any disclaimer, the term of this patent is extended or adjusted under 35 U.S.C. 154(b) by 0 days.

(21) Appl. No.: 18/665,753

(22) Filed: May 16, 2024

(65) Prior Publication Data

US 2025/0356742 A1 Nov. 20, 2025

(51) Int. Cl.
*G08B 5/38* (2006.01)
*A41F 9/00* (2006.01)
*G02B 5/00* (2006.01)
*G08B 5/00* (2006.01)

(52) U.S. Cl.
CPC ................ *G08B 5/38* (2013.01); *A41F 9/007* (2013.01); *G08B 5/002* (2013.01)

(58) Field of Classification Search
CPC .... G08B 5/38; G08B 5/36; G08B 3/10; F21V 23/0471; F21V 23/0464; F21V 14/02
See application file for complete search history.

(56) References Cited

U.S. PATENT DOCUMENTS 3,944,803 A 3/1976 Chao
5,045,979 A 9/1991 Stevens
5,779,348 A 7/1998 Interlicchio
D401,388 S 11/1998 Knight
8,840,263 B1 * 9/2014 Jones ..................... G08B 5/004 362/108
9,483,918 B2 11/2016 Uriarte
9,504,387 B2 * 11/2016 Alonsoperez Lanza ..................... A61B 5/0022
9,970,650 B1 * 5/2018 Afzali ..................... F21L 4/08
10,249,166 B1 * 4/2019 Carter ..................... G08B 6/00
D850,757 S 6/2019 Jackson
10,650,657 B1 5/2020 Curran
2012/0253485 A1 * 10/2012 Weast ..................... G06F 1/163 700/91
2015/0335135 A1 11/2015 Stoll
2017/0114963 A1 * 4/2017 Villalobos ................. F21L 4/02
2017/0151989 A1 6/2017 Daniels
2021/0319675 A1 * 10/2021 Bitetto ................ F21V 23/0471

FOREIGN PATENT DOCUMENTS

GB 2390524 1/2004

* cited by examiner

*Primary Examiner* — Joseph L Williams

(57) ABSTRACT

An illuminated safety belt device includes a personal electronic device that can be carried by a user. A belt is matable to itself to form a closed loop for wearing around a user's waist. A light housing is attached to the belt and a plurality of lights is each coupled to the light housing. Each of the plurality of lights emits light outwardly from the light housing thereby enhancing visibility of the user for oncoming motorists when the user is running or walking outdoors. A communication unit is integrated into the light housing and the communication unit is in remote communication with the personal electronic device and with each of the plurality of lights. The personal electronic device communicates control commands to the communication unit for actuating a selected one of the plurality of lights or for actuating all of the plurality of lights to alternatively flash on and off.

11 Claims, 5 Drawing Sheets

ILLUMINATED SAFETY BELT DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to safety belt devices and more particularly pertains to a new safety belt device for enhancing visibility of a user. The device includes a belt that can be worn around a user's waist and a plurality of light emitters, each coupled to the belt, which each emit a unique color of light with respect to each other. The plurality of light emitters enhance visibility of the user when the user is jogging along a roadway. The device includes a personal electronic device and a communication unit integrated into the belt that is in remote communication with the personal electronic device for controlling operational parameters of the plurality of lights.

(2) Description of Related Art Including Information Disclosed Under 37 CFR 1.97 and 1.98

The prior art relates to safety belt devices including a variety of body harnesses that have light emitters for enhancing visibility of a user at night and a waist belt that has light emitters and global positioning tracking which is in remote communication with an extrinsic communication network and a variety of animal collars that have light emitters for locating an animal in the dark. In no instance does the prior art disclose a belt that is wearable around a user's waist and a light housing which is attached to the belt and a plurality of light emitters attached to the light housing which each emit a unique color of light with respect to each other.

(h) BRIEF SUMMARY OF THE INVENTION

An embodiment of the disclosure meets the needs presented above by generally comprising a personal electronic device that can be carried by a user. A belt is matable to itself to form a closed loop for wearing around a user's waist. A light housing is attached to the belt and a plurality of lights is each coupled to the light housing. Each of the plurality of lights emits light outwardly from the light housing thereby enhancing visibility of the user for oncoming motorists when the user is running or walking outdoors. A communication unit is integrated into the light housing and the communication unit is in remote communication with the personal electronic device and with each of the plurality of lights. The personal electronic device communicates control commands to the communication unit for actuating a selected one of the plurality of lights or for actuating all of the plurality of lights to alternatively flash on and off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
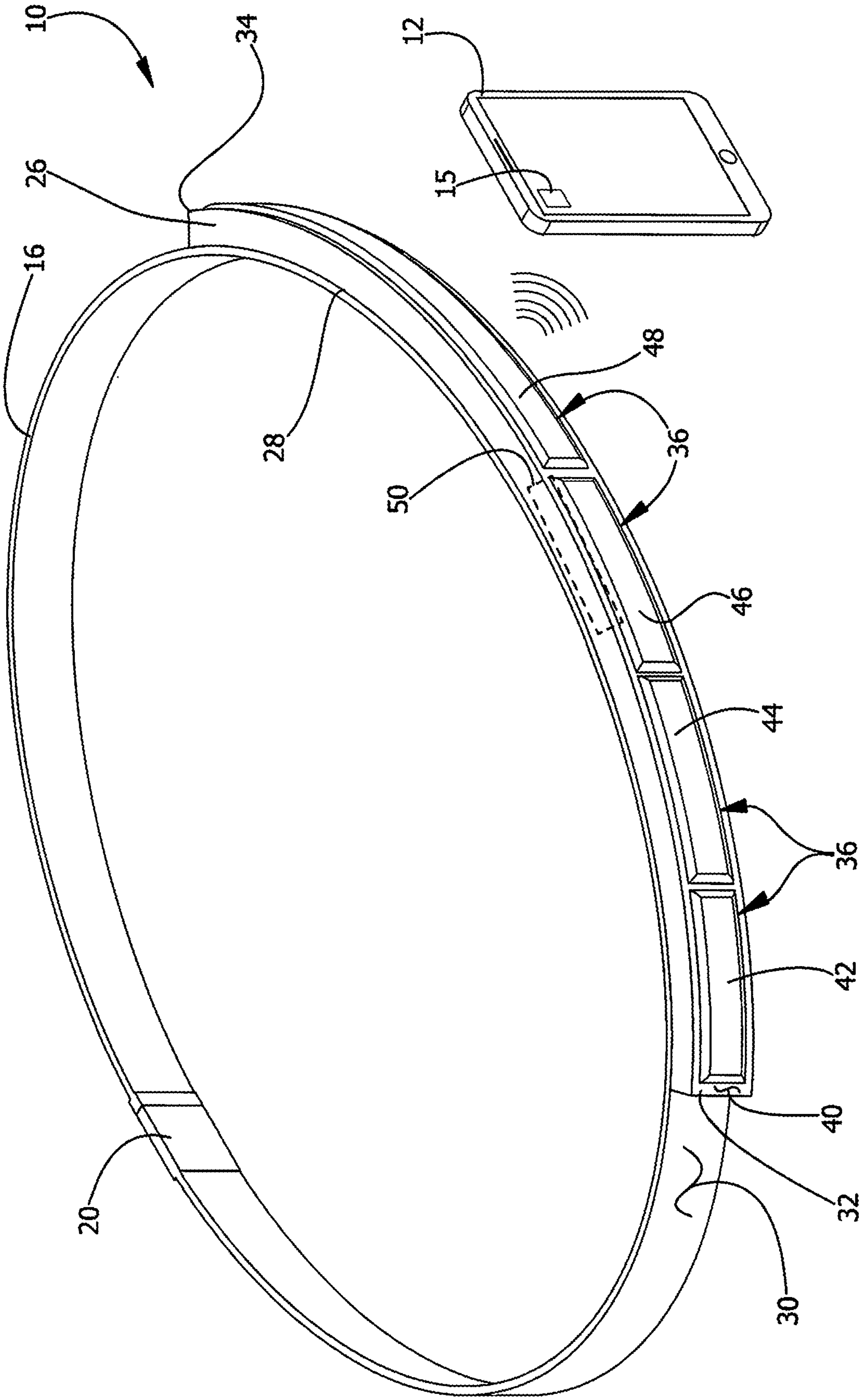
FIG. 1 is a perspective view of an illuminated safety belt device according to an embodiment of the disclosure.
Figure 2:
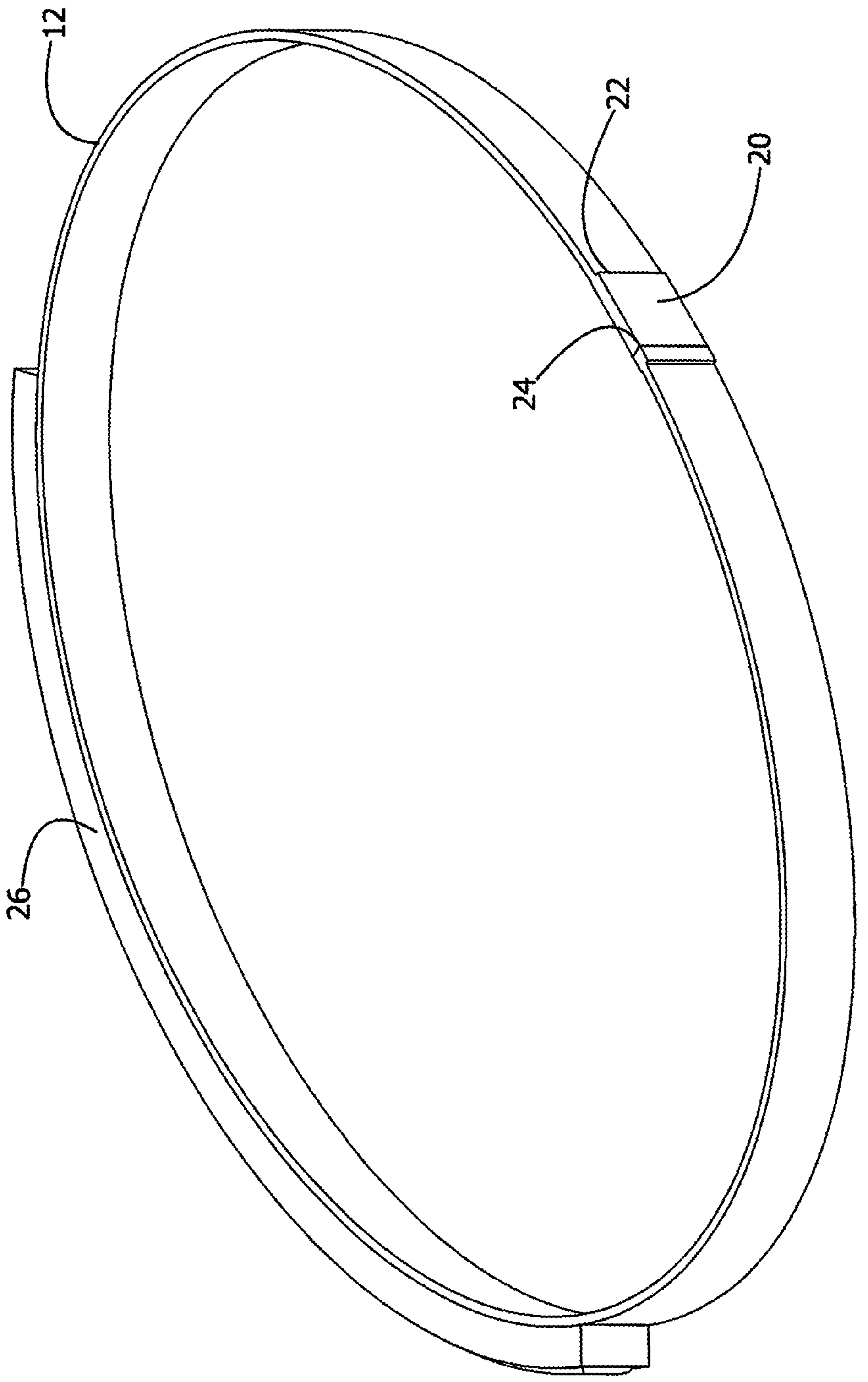
FIG. 2 is a back perspective view of an embodiment of the disclosure.
Figure 3:
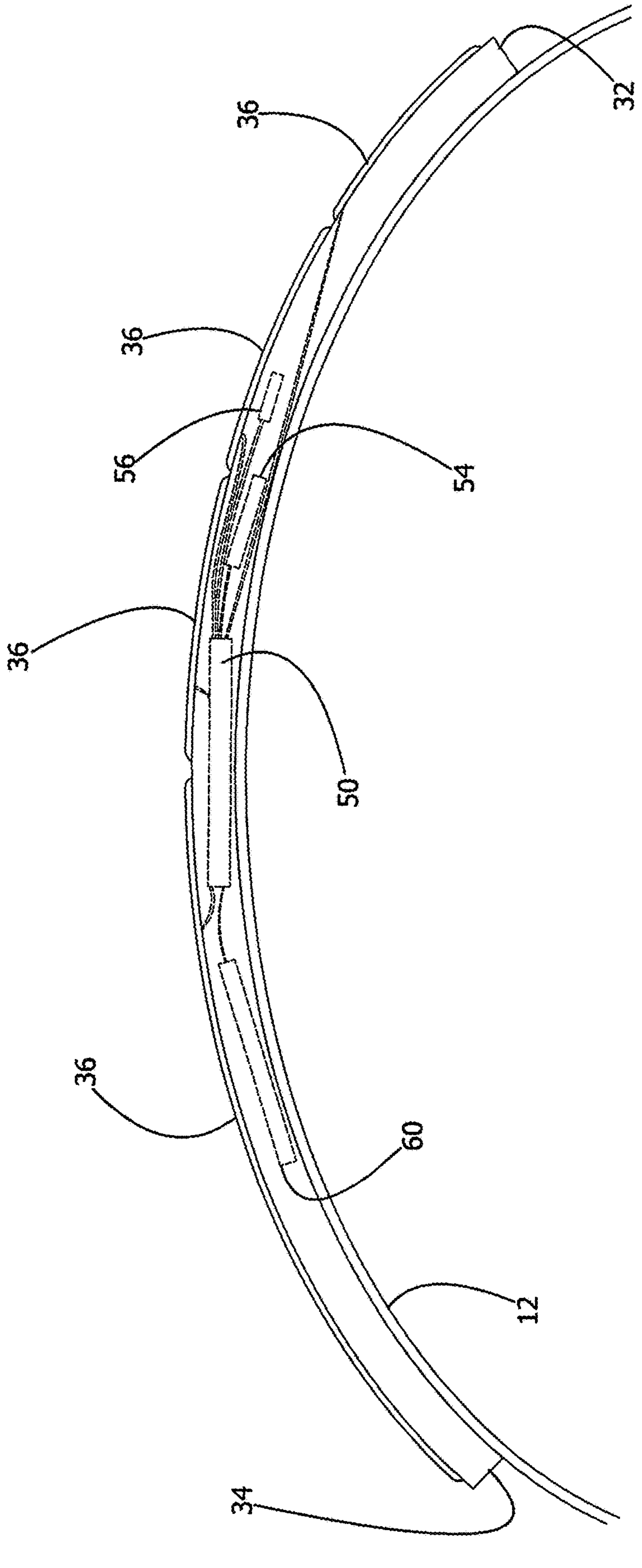
FIG. 3 is a top phantom view of an embodiment of the disclosure.
Figure 4:
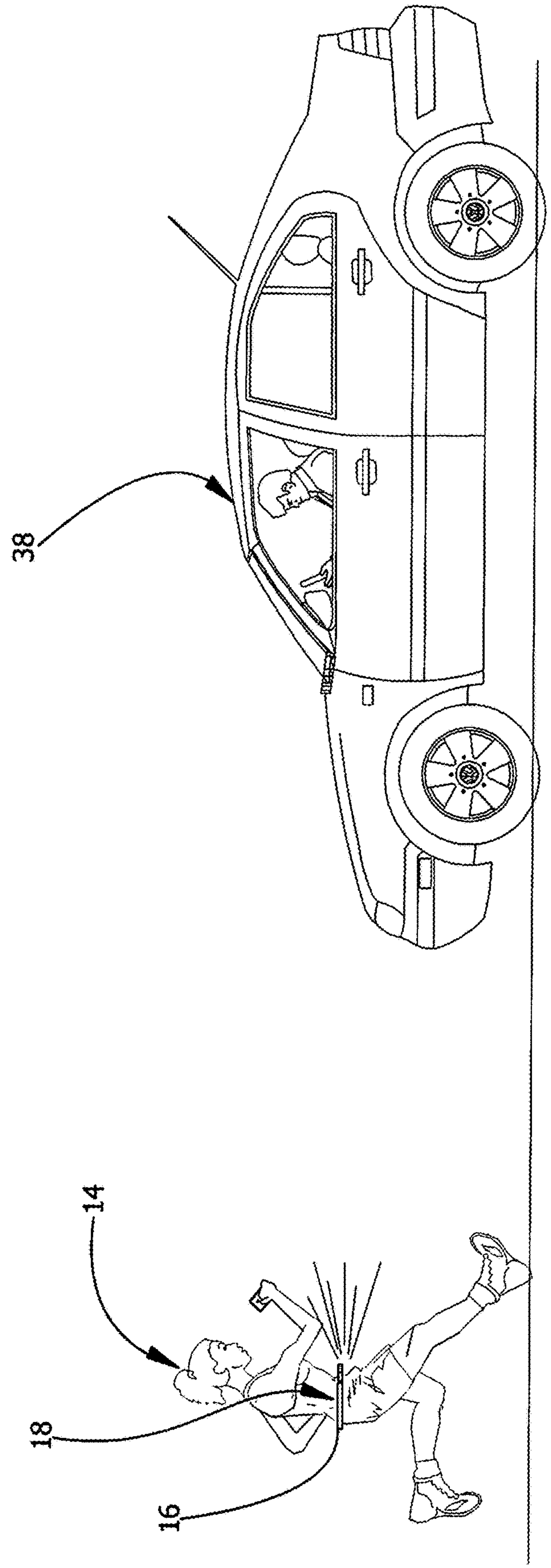
FIG. 4 is a perspective in-use view of an embodiment of the disclosure.
Figure 5:
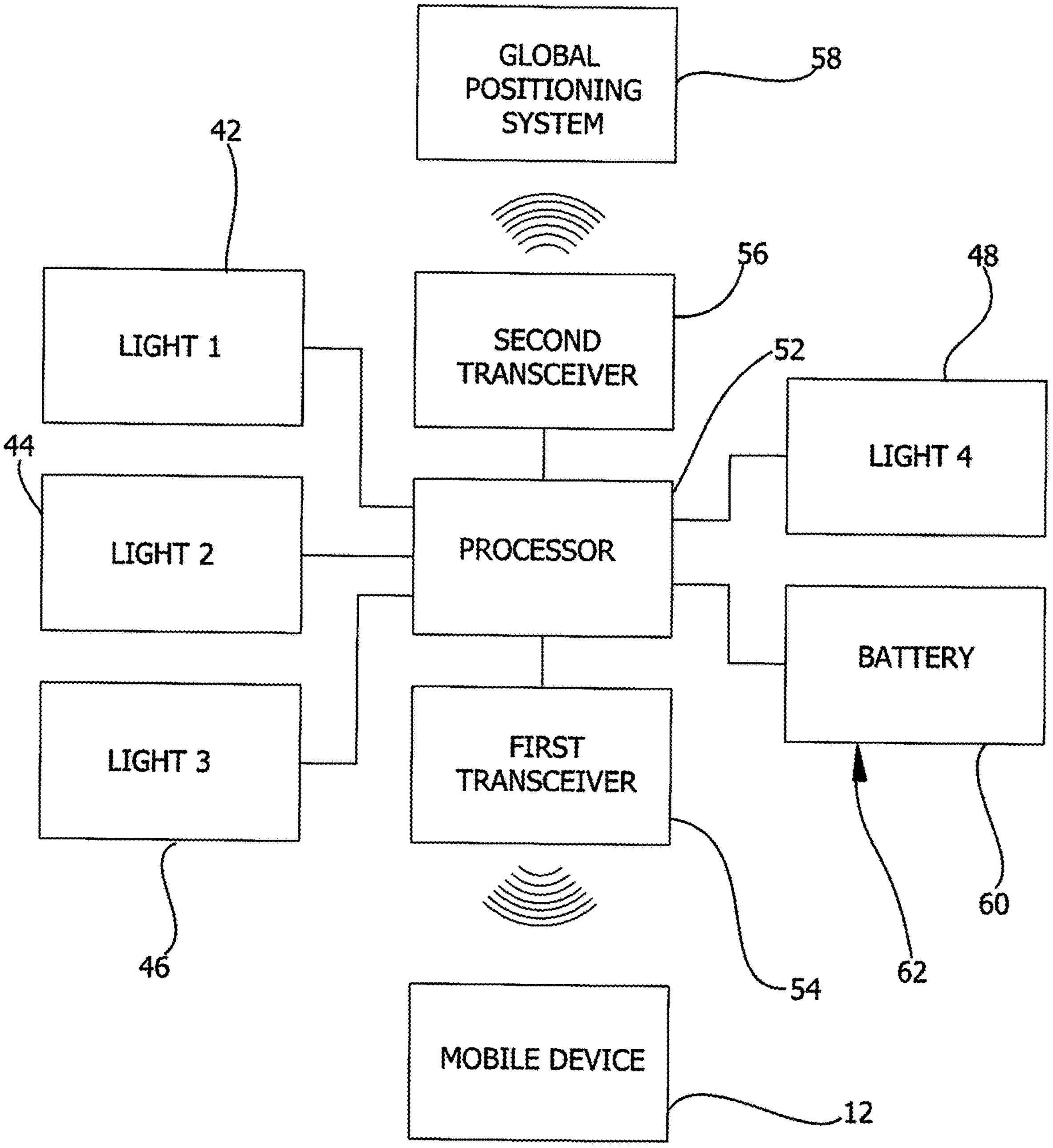
FIG. 5 is a schematic view of an embodiment of the disclosure.

With reference now to the drawings, and in particular to FIGS. 1 through 5 thereof, a new safety belt device embodying the principles and concepts of an embodiment of the disclosure and generally designated by the reference numeral 10 will be described.

As best illustrated in FIGS. 1 through 5, the illuminated safety belt device 10 generally comprises a personal electronic device 12 that can be carried by a user 14 and the personal electronic device 12 stores digital data comprising a control application 15. The personal electronic device 12 may comprise a smartphone or other type of electronic device that has wireless communication capabilities. A belt 16 is provided which is matable to itself to form a closed loop such that the belt 16 can be worn around the user's waist 18. The belt 16 has a clasp 20 that is attached to a first end 22 of the belt 16 and the clasp 20 releasably engages a second end 24 of the belt 16 to form the belt 16 into the closed loop.

A light housing 26 is provided and the light housing 26 has a rear wall 28 that is attached to a front surface 30 of the belt 16. The light housing 26 is elongated between a primary end 32 and a secondary end 34 of the light housing 26 and the light housing 26 is centrally positioned between the first end 22 and the second end 24 of the belt 16. A plurality of lights 36 is each coupled to the light housing 26 and each of the plurality of lights 36 emits light outwardly from the light housing 26. In this way the lights 36 enhance visibility of the user 14 for oncoming motorists 38 when the user 14 is running or walking outdoors. The user 14 may be a physically disabled user that relies on a wheelchair and the belt 16 can be secured around the wheelchair when the wheelchair is being employed outdoors. Each of the lights 36 emits a unique color of light with respect to each other to communicate various levels of distress to the oncoming motorists 38 when the user 14 is jogging along a roadway, for example. Each of the plurality of lights 36 may comprise a light emitting diode or other type of electronic light emitter.

Each of the lights 36 is positioned on a forward surface 40 of the light housing 26 and the plurality of lights 36 is evenly spaced apart from each other and is distributed along the forward surface 40 of the light housing 26. The plurality of lights 36 includes a red light 42, a yellow light 44, a green light 46 and a white light 48. The red light 42 emits light of a red color to alert oncoming motorists 38 that the user 14 is having an emergency and needs assistance. The yellow light 44 emits light of a yellow color to alert oncoming motorists 38 to be cautious. The green light 46 emits a light of a green color to alert oncoming motorists 38 that all is clear with respect to the user 14. The white light 48 emits light of a white color to alert oncoming motorists 38 that the user 14 is lost. Each of the red light 42, the yellow light 44 and the green light 46 is elongated to have an equal length with respect to each other. Furthermore, the white light 48 is elongated to have a length that is greater than the length of each of the red light 42, the yellow light 44 and the green light 46.

A communication unit 50 is integrated into the light housing 26 and the communication unit 50 is in remote communication with the personal electronic device 12. The communication unit 50 is in communication with each of the plurality of lights 36 and the personal electronic device 12 communicates control commands to the communication unit 50 for actuating a selected one of the plurality of lights 36 or for actuating all of the plurality of lights 36 to alternatively flash on and off.

The communication unit 50 comprises a processor 52 that is integrated into the light housing 26. The processor 52 receives a red input, a yellow input, a green input, a white input and a flash input. The communication unit 50 includes a first transceiver 54 that is integrated into the light housing 26. The first transceiver 54 is electrically coupled to the processor 52 and the first transceiver 54 is in wireless communication with the personal electronic device 12. Additionally, the first transceiver 54 may comprise a radio frequency transceiver or the like and the first transceiver 54 may employ Bluetooth communication protocols.

The processor 52 receives the red input when the first transceiver 54 receives a red command from the personal electronic device 12 and the red light 42 is turned on when the processor 52 receives the red input. The processor 52 receives the yellow input when the first transceiver 54 receives a yellow command from the personal electronic device 12 and the yellow light 44 is turned on when the processor 52 receives the yellow input. The processor 52 receives a green input when the first transceiver 54 receives a green command from the personal electronic device 12 and the green light 46 is turned on when the processor 52 receives the green input. The processor 52 receives a white input when the first transceiver 54 receives a white command from the personal electronic device 12 and the white light 48 is turned on when the processor 52 receives the white input. Finally, the processor 52 receives the flash input when the first transceiver 54 receives a flash command from the personal electronic device 12 and each of the plurality of lights 36 is turned on the alternately flash on and off when the processor 52 receives the flash input.

The communication unit 50 includes a second transceiver 56 that is integrated into the light housing 26 and the second transceiver 56 is electrically coupled to the processor 52. The second transceiver 56 is in wireless communication with a global positioning system 58 thereby facilitating the processor 52 to receive the physical location of the belt 16. In this way the second transceiver 56 can facilitate the user 14 to track the belt 16 with the personal electronic device 12. The second transceiver 56 may comprise a radio frequency transceiver or the like and the second transceiver 56 may employ a communication frequency that is compatible with satellite communications. The communication unit 50 includes a power supply 60 that is integrated into the belt 16. The power supply 60 is electrically coupled to the processor 52 and the power supply 60 comprises a battery 62 that is integrated into the light housing 26.

In use, the belt 16 is worn around the user's waist 18 and the control application 15 in the personal electronic device 12 is manipulated to turn on either the red light 42 or the yellow light 44 or the green light 46 or the white light 48, depending upon the situation of the user 14. In this way the user 14 clearly visible in a darkened environment thereby reducing the likelihood that the user 14 will be struck by oncoming motorists 38 when the user 14 is jogging along a roadway. Furthermore, the user 14 can visually communicate to oncoming motorists 38 that the user 14 needs help or that the user 14 is experiencing an emergency or that the user 14 is experiencing no problems or that the user 14 is lost. The user 14 can additionally manipulate the control application 15 in the personal electronic device 12 to actuate all of the lights 36 to alternately flash on and off.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated safety belt device for visually identifying a jogger thereby facilitating motorists to be aware of the jogger, said device comprising:

a personal electronic device being configured to be carried by a user, said personal electronic device storing digital data comprising a control application;

a belt being matable to itself to form a closed loop wherein said belt is configured to be worn around a user's waist;

a light housing being attached to said belt;

a plurality of lights, each of said lights being coupled to said light housing wherein each of said plurality of lights is configured to emit light outwardly from said light housing in a forward direction being substantially parallel to a surface on which the user is running or walking outdoors whereby said plurality of lights are configured to emit light toward a line of sight of oncoming motorists thereby enhancing visibility of the user for the oncoming motorists when the user is running or walking outdoors, each of said lights emitting a unique color of light with respect to each other wherein each of said plurality of lights is configured to communicate various levels of distress to the oncoming motorists;

a communication unit being integrated into said light housing, said communication unit being in remote communication with said personal electronic device, said communication unit being in communication with each of said plurality of lights, said personal electronic device communicating control commands to said communication unit for actuating a selected one of said plurality of lights or for actuating all of said plurality of lights to alternatively flash on and off a processor being integrated into said light housing;

a first transceiver being integrated into said light housing, said first transceiver being electrically coupled to said processor, said first transceiver being in wireless communication with said personal electronic device; and a second transceiver being integrated into said light housing, said second transceiver being electrically coupled to said processor, said second transceiver being in wireless communication with a global positioning system to determine a physical location of said belt independently of a second physical location of said personal electronic device wherein said processor facilitates tracking said physical location of said belt with said personal electronic device when said belt is separated from said second physical location of said personal electronic device.

2. The device according to claim 1, wherein:

said light housing has a rear wall being attached to a front surface of said belt;

said light housing is elongated between a primary end and a secondary end of said light housing;

said light housing is centrally positioned between said first end and said second end of said belt;

each of said lights is positioned on a forward surface of said light housing; and said plurality of lights is evenly spaced apart from each other and is distributed along said forward surface of said light housing.

3. The device according to claim 1, wherein said plurality of lights includes a red light and a yellow light and a green light and a white light.

4. The device according to claim 3, wherein said red light emits light of a red color wherein said red light is configured to alert oncoming motorists that the user is having an emergency and needs assistance.

5. The device according to claim 4, wherein said yellow light emits light of a yellow color wherein said yellow light is configured to alert oncoming motorists to be cautious.

6. The device according to claim 4, wherein said green light emits a light of a green color wherein said green light is configured to alert oncoming motorists that all is clear with respect to the user.

7. The device according to claim 4, wherein said white light emits light of a white color wherein said white light is configured to alert oncoming motorists that the user is lost.

8. The device according to claim 3, wherein:

each of said red light and said yellow light and said green light has an equal length with respect to each other; and said white light has a length being greater than the length of each of said red light and said yellow light and said green light.

9. The device according to claim 3, wherein said communication unit comprises:

said processor receiving a red input and a yellow input and a green input and a white input and a flash input;

said processor receives said red input when said first transceiver receives a red command from said personal electronic device;

said red light is turned on when said processor receives said red input;

said processor receives said yellow input when said first transceiver receives a yellow command from said personal electronic device;

said yellow light is turned on when said processor receives said yellow input;

said processor receives a green input when said first transceiver receives a green command from said personal electronic device;

said green light is turned on when said processor receives said green input;

said processor receives a white input when said first transceiver receives a white command from said personal electronic device;

said white light is turned on when said processor receives said white input;

said processor receives said flash input when said first transceiver receives a flash command from said personal electronic device; and each of said plurality of lights is turned on to alternately flash on and off when said processor receives said flash input.

10. The device according to claim 9, wherein said communication unit further comprises:

a power supply being integrated into said belt, said power supply being electrically coupled to said processor, said power supply comprising a battery being integrated into said light housing.

11. An illuminated safety belt device for visually identifying a jogger thereby facilitating motorists to be aware of the jogger, said device comprising:

a personal electronic device being configured to be carried by a user, said personal electronic device storing digital data comprising a control application;

a belt being matable to itself to form a closed loop wherein said belt is configured to be worn around a user's waist, said belt having a clasp being attached to a first end of said belt, said clasp releasably engaging a second end of said belt to form said belt into said closed loop;

a light housing being attached to said belt, said light housing having a rear wall being attached to a front surface of said belt, said light housing being elongated between a primary end and a secondary end of said light housing, said light housing being centrally positioned between said first end and said second end of said belt;

a plurality of lights, each of said lights being coupled to said light housing wherein each of said plurality of lights is configured to emit light outwardly from said light housing in a forward direction being substantially parallel to a surface on which the user is running or walking outdoors whereby said plurality of lights are configured to emit light toward a line of sight of oncoming motorists thereby enhancing visibility of the user for the oncoming motorists when the user is running or walking outdoors, each of said lights emitting a unique color of light with respect to each other wherein each of said plurality of lights is configured to communicate various levels of distress to the oncoming motorists, each of said lights being positioned on a forward surface of said light housing, said plurality of lights being evenly spaced apart from each other and being distributed along said forward surface of said light housing, said plurality of lights including a red light and a yellow light and a green light and an white light, said red light emitting light of a red color wherein said red light is configured to alert oncoming motorists that the user is having an emergency and needs assistance, said yellow light emitting light of a yellow color wherein said yellow light is configured to alert oncoming motorists to be cautious, said green light emitting a light of a green color wherein said green light is configured to alert oncoming motorists that all is clear with respect to the user, said white light emitting light of a white color wherein said white light is configured to alert oncoming motorists that the user is lost, each of said red light and said yellow light and said green light having an equal length with respect to each other, said white light having a length being greater than the length of each of said red light and said yellow light and said green light;

a communication unit being integrated into said light housing, said communication unit being in remote communication with said personal electronic device, said communication unit being in communication with each of said plurality of lights, said personal electronic device communicating control commands to said communication unit for actuating a selected one of said plurality of lights or for actuating all of said plurality of lights to alternatively flash on and off, said communication unit comprising:

a processor being integrated into said light housing, said processor receiving a red input and a yellow input and a green input and a white input and a flash input;

a first transceiver being integrated into said light housing, said first transceiver being electrically coupled to said processor, said first transceiver being in wireless communication with said personal electronic device, said processor receiving said red input when said first transceiver receives a red command from said personal electronic device, said red light being turned on when said processor receives said red input, said processor receiving said yellow input when said first transceiver receives a yellow command from said personal electronic device, said yellow light being turned on when said processor receives said yellow input, said processor receiving a green input when said first transceiver receives a green command from said personal electronic device, said green light being turned on when said processor receives said green input, said processor receiving a white input when said first transceiver receives a white command from said personal electronic device, said white light being turned on when said processor receives said white input, said processor receiving said flash input when said first transceiver receives a flash command from said personal electronic device, each of said plurality of lights being turned on the alternately flash on and off when said processor receives said flash input;

a second transceiver being integrated into said light housing, said second transceiver being electrically coupled to said processor, said second transceiver being in wireless communication with a global positioning system to determine a physical location of said belt independently of a second physical location of said personal electronic device wherein said processor facilitates tracking said physical location of said belt with said personal electronic device when said belt is separated from said personal electronic device; and a power supply being integrated into said belt, said power supply being electrically coupled to said processor, said power supply comprising a battery being integrated into said light housing.

* * * * *